United States Patent Office 3,299,145
Patented Jan. 17, 1967

3,299,145
METHOD FOR PREPARING BIS(2-ALKOXYETHYL) SULFONES
Charles H. Chang, Easton, Pa., assignor to General Aniline & Film Corporation, New York, N.Y., a corporation of Delaware
No Drawing. Filed Dec. 30, 1963, Ser. No. 334,611
7 Claims. (Cl. 260—607)

This invention relates to a new chemical process, and more particularly to a new method for preparing a bis(2-alkoxyethyl)sulfone.

A number of methods have been previously proposed for the preparation of bis(2-alkoxyethyl)sulfones, most of which involve the use of toxic and skin vesicant starting materials such as divinyl sulfone, 2-haloethyl vinyl sulfones, bis(haloethyl)sulfones, and the like. Other previously proposed methods are likewise disadvantageous for one or more reasons, including unduly high costs, difficulty in control, etc.

It is an object of this invention to provide a method for preparing a bis(2-alkoxyethyl)sulfone which will not be subject to one or more of the above disadvantages. Other objects and advantages will appear as the description proceeds.

The attainment of the above objects is made possible by this invention which broadly includes reacting one mole of a 1,4-thioxane dioxide with two moles of an alkanol at an elevated temperature in the presence of a member of the group consisting of alkali metal hydroxides and alkoxides. This process has been found to be simple and readily controlled. Its operativeness is highly surprising in view of the extreme stability to heat and to strong oxidation of the known 1,4-thioxane dioxide.

The alkanol employed in the claimed etherification reaction may be a straight or branched, saturated or unsaturated, substituted or unsubstituted alkanol containing from 1 to 18 carbon atoms or more. The preferred alkanols are the lower molecular weight monohydric alcohols containing about 1 to 5 carbon atoms such as methyl, ethyl, and normal and isomeric propyl, butyl, and amyl alcohol. Higher alcohols may be employed including lauryl alcohol, stearyl alcohol, the highly branched chain aliphatic monohydric primary alcohols such as tridecyl alcohol as produced by the Oxo process from branched chain olefins such as di-, tri-, and tetrapropylene, -butylene, -isobutylene, and the like. The alcohol may be unsaturated, as for example allyl and oleyl alcohol, and/or primary, secondary or tertiary. Further, the aliphatic chain of the alcohol may be interrupted by one or more hetero atoms or groups such as O, S, NR and the like, where R is an alkyl of 1 to 16 or more carbon atoms or an aryl such as phenyl, as for example, the monoalkylethers of ethylene, glycol, diethylene glycol, propylene glycol, butylene glycol, diethanol sulfide, diethanol ethylamine, N,N'-diethanol-N,N'-dipropylethylenediamine, and the like. The alkanol may contain other inert substituents, the essential requirement being that it contain a single OH group bonded to a carbon atom as the sole reactive-hydrogen containing group.

The action is carried out in the presence of a hydroxide or alkoxide of an alkali metal such as sodium, potassium, or lithium. The hydroxide is preferably added in anhydrous form although it may contain some water which would be removed from the reaction medium together with the water of condensaiton. The alkoxides employed are actually the alkali metal salts of the alkanol employed in the reaction and are conveniently formed in situ in the reaction medium by addition thereto of the alkali metal in free elemental form. The alkali metal hydroxide or alkoxide may be employed in catalytic amounts, as for example from about 0.03 to 0.08 mole per mole of the 1,4-thioxane dioxide although up to equivalent amounts may be employed i.e., up to 2 moles per mole of the 1,4-thioxane dioxide.

The 1,4-thioxane dioxide employed as reactant herein has the formula

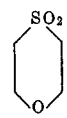

One or more of the vacant positions in the above reactant may be substituted by an alkyl group of the type present in the above described alkanols, an aryl group such as phenyl or naphthyl or any other inert substituent.

The reaction is carried out at an elevated temperature, e.g., at least about 50° C., reflux temperatures being preferred. The reaction is accelerated by elevated temperatures and/or by removal of the water of condensation as it is formed. With the low boiling alkanols of 1 to 3 carbon atoms, superatmospheric pressure is advantageous. With the higher boiling, water immiscible alcohols of at least 4 carbon atoms, the reaction may be carried out above the boiling point of water with continuous removal of the water of condensation, although this is not particularly efficient or desirable. The preferred method when employing alkanols of at least 4 carbon atoms is to add to the reaction medium a water immiscible hydrocarbon which forms an azeotrope with water, preferably having a boiling point below that of the alkanol. As examples of such hydrocarbons, there may be mentioned aromatic hydrocarbons such as pentane, hexane, and the like. In such case, the reaction is carried out under reflux using known means for returning the reactants to the reaction vessel and known means for removing and condensing the azeotropic mixture of hydrocarbon and water of condensation and recycling the condensed hydrocarbon back to the reaction mixture. A hydrocarbon is preferably employed which boils below the boiling point of the alkanol employed and which forms an azeotrope with water boiling at a still lower temperature.

In carrying out the reaction the reactants may be employed in stoichiometric proportions although it is preferred to employ an excess of up to 25 or more moles of the alkanol per mole of the 1,4-thioxane dioxide which excess favors completion of the reaction and complete utilization of the 1,4-thioxane dioxide reactant.

The bis(2-alkoxyethyl)sulfones produced by the process of this invention are effective agents for improving the wash-and-wear, dry and wet crease resistance of fibrous materials, particularly cellulose textile materials. For such purpose, such sulfones may be applied to the fibrous material from an aqueous medium followed by drying and curing the treated fibrous material in the presence of an alkaline catalyst such as sodium or potassium hydroxide, carbonate or bicarbonate or the like, at an elevated temperature of 220 to 475° F. or the like.

The following examples are only illustrative of this invention and are not to be regarded as limitative. All parts and proportions referred to herein and in the appended claims are by weight unless otherwise indicated.

*Example I*

To a three-necked flask containing 0.5 g. (0.0217 g. atom) of metallic sodium dissolved in 150 ml. of n-butanol were added 100 ml. of benzene and 13.6 g. (0.1 mole) of 1,4-thioxane dioxide. The reaction mixture was azeotroped using a water separator with stirring for one hour and forty minutes and then acidified with acetic acid. The resultant mixture was evaporated under reduced pressure and elevated temperature to remove unchanged alcohol and benzene. The residue was then mixed with 150 ml. of ether, filtered and washed with ether to give a mixture of sodium acetate and unchanged thioxane dioxide on the filter paper and bis-(2-n-butoxyethyl)sulfone in the filtrate. Extraction of the residue on the filter with benzene gave 0.8 g. (5.9%) of 1,4-thioxane dioxide. The filtrate was evaporated under reduced pressure and elevated temperature on a steam bath to give 24 g. (90.2%) of crude product. Distillation of the crude product in vacuo gave 22 g. (82.7%) of bis-(2-n-butoxyethyl) sulfone, B.P. 137–9° (0.1 mm.); $n_D^{25}$ 1.4512.

*Example II*

In a flask a mixture of 27.2 g. (0.2 mole) of 1,4-thioxane dioxide, 2 g. of sodium hydroxide dissolved in 150 ml. methanol and 3.6 g. (0.2 mole) of water was heated under reflux for 42 hours. After acidification with acetic acid, the methanol was removed under reduced pressure. The residue was then mixed with 150 ml. of dry ether, filtered and washed with ether to give 7.5 g. of solid material on filter and 32 g. (87.9%) of crude product after removal of solvent. Extraction of the material on filter gave 2.9 g. (10.7%) of thioxane dioxide unchanged, M.P. 132° C. Distillation of the crude product in vacuo gave 30 g. (82.4%) of bis-(2-methoxyethyl)sulfone, B.P. 112° C. (0.4 mm.); $n_D^{25}$ 1.4608.

This invention has been disclosed with respect to certain preferred embodiments, and various modifications and variations thereof will become obvious to persons skilled in the art and are to be included within the spirit and purview of this invention and application and the scope of the appended claims.

I claim:

1. A method for preparing a bis(2-alkoxyethyl) sulfone comprising reacting 1 mole of a 1,4-thioxane dioxide with 2 moles of an aliphatic alcohol containing a single OH group bonded to a carbon atom as the sole reactive hydrogen-containing group at an elevated temperature of at least about 50° C. in the presence of a member of the group consisting of alkali metal hydroxides and alkoxides.

2. A method as defined in claim 1 wherein said alcohol contains about 1 to 5 carbon atoms.

3. A method as defined in claim 1 carried out under reflux.

4. A method as defined in claim 1 carried out under superatmospheric pressure.

5. A method as defined in claim 1 carried out while removing from the reaction mixture the water of condensation.

6. A method for preparing a bis(2-alkoxyethyl) sulfone comprising refluxing a mixture containing
    (1) 1,4-thioxane dioxide
    (2) an aliphatic alcohol of at least four carbon atoms, and containing a single OH group bonded to a carbon atom as the sole reactive hydrogen-containing group, in a molar amount at least twice that of the 1,4-thioxane dioxide
    (3) a member of the group consisting of alkali metal hydroxides and alkoxides, and
    (4) a water insoluble liquid aromatic hydrocarbon capable of forming an azeotropic mixture with water, removing and condensing the azeotropic mixture of aromatic hydrocarbon and water of condensation, and recycling the condensed aromatic hydrocarbon to the reaction mixture.

7. A method as defined in claim 6 wherein said aromatic hydrocarbon is selected from the group consisting of a benzene, toluene and xylene.

No references cited.

CHARLES B. PARKER, *Primary Examiner.*

D. R. PHILLIPS, *Assistant Examiner.*